Figure 1:
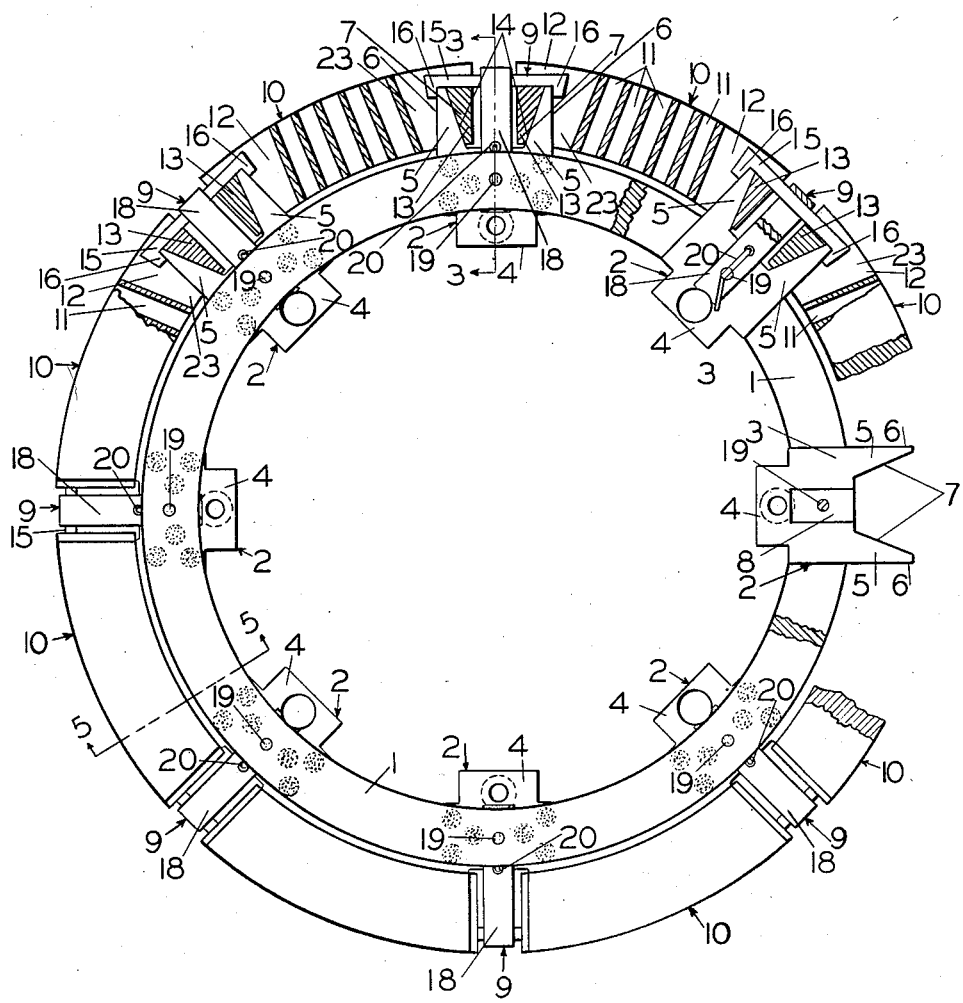

May 22, 1951  J. C. McCUNE  2,553,828
ROTATABLE FRICTION ELEMENT
Filed Dec. 27, 1945  3 Sheets-Sheet 1

INVENTOR
JOSEPH C. McCUNE
BY A. L. Vencill
ATTORNEY

May 22, 1951   J. C. McCUNE   2,553,828
ROTATABLE FRICTION ELEMENT
Filed Dec. 27, 1945   3 Sheets-Sheet 2
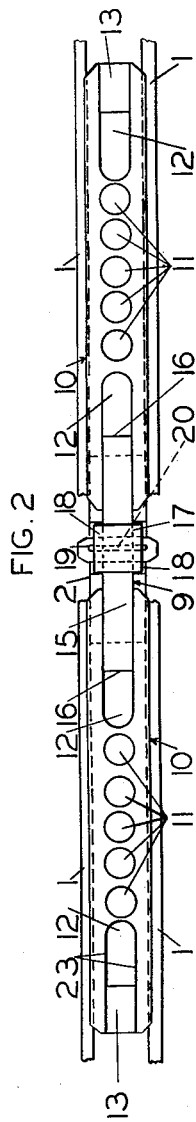
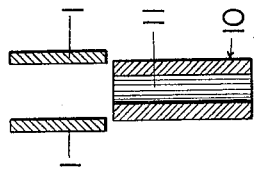
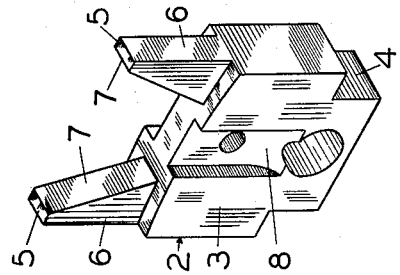
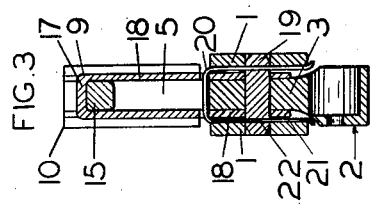
INVENTOR
JOSEPH C. McCUNE
BY
ATTORNEY May 22, 1951 J. C. McCUNE 2,553,828
ROTATABLE FRICTION ELEMENT
Filed Dec. 27, 1945 3 Sheets-Sheet 3
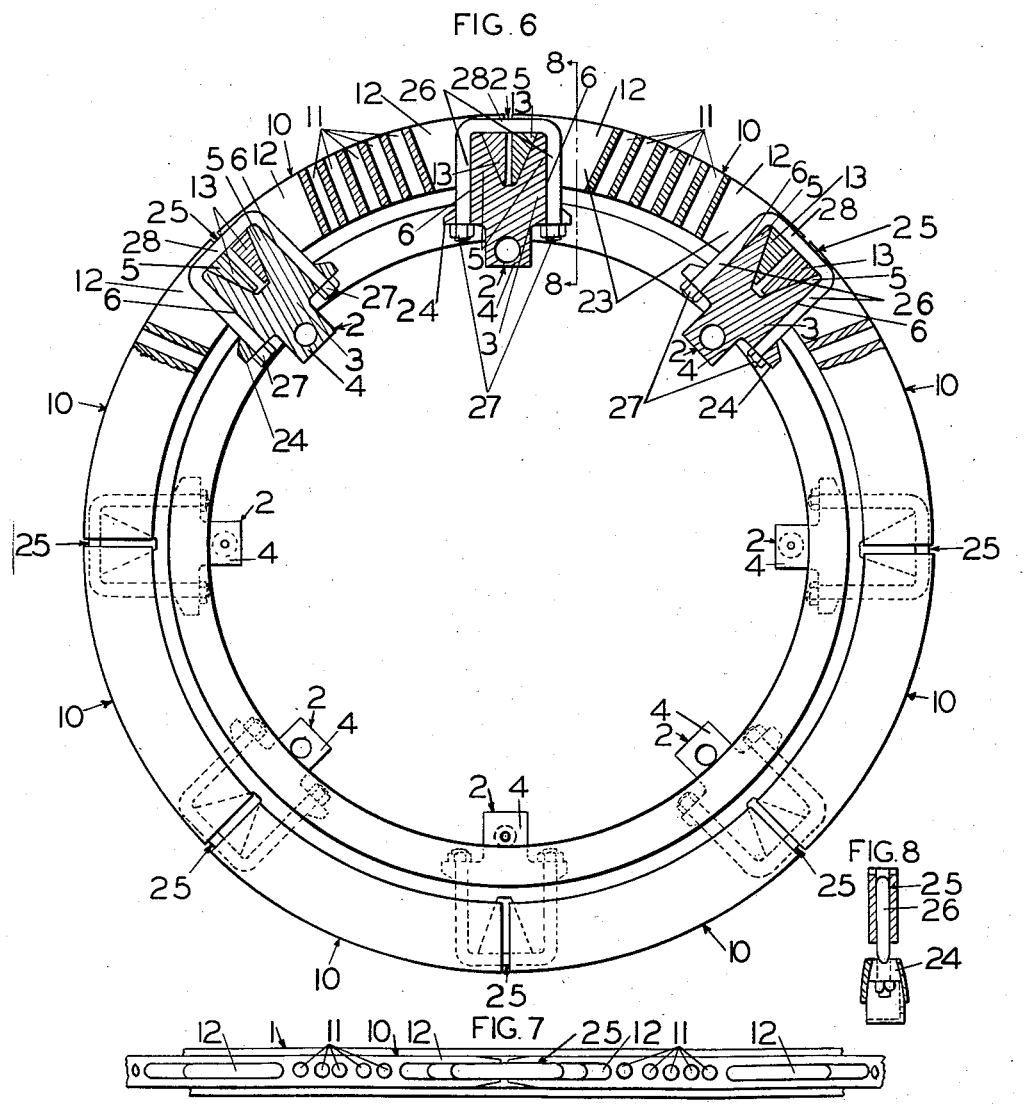
INVENTOR
JOSEPH C. McCUNE
BY
A. L. Vencill
ATTORNEY Patented May 22, 1951

2,553,828

UNITED STATES PATENT OFFICE 2,553,828

ROTATABLE FRICTION ELEMENT

Joseph C. McCune, Edgewood, Pa., assignor to The Westinghouse Air Brake Company, Wilmerding, Pa., a corporation of Pennsylvania Application December 27, 1945, Serial No. 637,302

8 Claims. (Cl. 188—218)

This invention relates to friction elements and more particularly to friction elements of the type for use in disc brakes or disc clutches.

The usual disc brake or disc clutch comprises a plurality or pack of disc-like friction elements which are movable either into or out of frictional engagement with each other. In a disc brake some of the friction elements rotate with an element to be braked, such for instance as a wheel and axle assemblage of a railway vehicle, while the other friction elements are maintained non-rotative, so that all of the friction elements, when they frictionally interengage, will act to oppose rotation of the rotatable element. In clutches some of the friction elements are rotatable with a driving element, whereas the other friction elements are secured to the driven element, so that the elements, when they frictionally interengage, will transmit rotary motion from the driving element to the driven element.

Rotatable friction elements of the disc type, especially those for use in disc brakes for railway vehicles, usually comprise a single relatively thick continuous annular member made of cast metal the major portion of the faces being adapted to frictionally engage the friction faces of the non-rotatable friction element of the brake.

In practice it was found that where this type of friction brake element was employed in a disc brake on a heavy vehicle such as a railway car, the heat created in the element became quite high, especially in braking on a long descending grade. Upon a subsequent release of the brakes the element of course cooled. It was found that after a time this alternate heating and cooling of the element caused dishing or warping of the element as a whole. In some instances it was found that the dishing of the element was great enough to cause the friction faces thereof to contact the non-rotatable or stationary friction elements of the brake and produce a braking torque when the friction elements were intended to be in their brake release position. This is of course very objectionable and cannot be tolerated.

The cause of this dishing of the friction elements may be described as follows: Assume that the friction characteristics of each square inch of the friction surfaces of the rotating friction element are the same. Since the velocity of any given point on the outer circumferential portions of the friction surfaces of the friction elements is greater than that of a given point on the inner circumferential portions of the friction surfaces, more heat will be created at said outer circumferential portions because the degree of heat is proportional to the degree of retarding force and velocity. Therefore, more heat is absorbed by the outer circumferential portions of the elements, consequently these portions become hotter than the inner circumferential portions of the elements.

For the purpose of this description let it be assumed that the outside diameter of the friction element is about 24 inches and that the outer circumferential portion of each friction element becomes one hundred degrees Fahrenheit (100° F.) hotter than the inner circumferential portion. It will be understood that both circumferential portions are hot and that the 100° F. represents a differential temperature. To accommodate this higher temperature the outer edge of the outer circumferential portion must expand circumferentially about three sixty-fourths of an inch with reference to the inner edge of the inner circumferential portion. Since the element is a solid or continuous ring the outer circumferential edge of the element will move radially outward about one sixty-fourth of an inch.

It can be assumed therefore that an outer circumferential portion of the friction element has expanded without taking a permanent set and the inner circumferential portion while it has expanded due to heat it has been pulled beyond its elastic limit by the outer portion and as a consequence has taken a permanent set.

Now when the element cools the outer circumferential portion thereof will return to substantially its original condition but the inner circumferential portion cannot return to its original condition because of the permanent set which it has taken. Since the outer circumferential part does return to substantially its original dimensions and the inner circumferential portion cannot, it follows that the element will dish in one direction or the other.

If this force is not great enough to thus bend the element, the efficiency of the brake as a whole will be materially lessened since less than the full area of the friction faces of the elements will be effective to oppose rotation of the member to be braked.

The principal object of the invention is to provide a novel friction element for use in disc brakes or the like which will retain substantially its original flat condition under all conditions of braking service and therefore be free of the above mentioned objectionable features.

Another object of the invention is to provide a friction element for use in disc brakes or the like with a novel ventilating arrangement whereby excessive heating of the brake shoes as well as the other associated parts of the element is effectively prevented.

Another object of the invention is to provide a friction element for use in disc brakes or the like having a novel friction shoe arrangement in which there is a plurality of friction shoes so disposed with relation to each other and with the body portion of the element that they may expand and contract without danger of damage to each other or to the body portion.

Another object of the invention is to provide a friction element for use in disc brakes or the like with a plurality of relatively short brake shoe segments and a novel structure for securing the ends of adjacent segments together and to the body of the element to facilitate the removal or replacement of the shoe segments when necessary.

A further object of the invention is to provide a friction element for use in disc brakes or the like having a body portion and a novel friction shoe arrangement whereby the breaking or cracking of a shoe will in no way affect the body portion of the element which transmits the braking torque to the member to be braked.

A further object of the invention is to provide a friction element for use in disc brakes or the like with a body portion, a plurality of brake shoe segments separate from the body portion and a plurality of members for securing the shoes together and to the body portion, each member being arranged between the adjacent ends of adjacent shoe segments. According to this feature, the brake shoe segments since they are separate from the body portion will not transmit as much heat to the body portion as would be the case if these parts were integral. Further, the space between the shoe segments permits air to freely circulate around and through the shoe segments and the body portion thus providing for the effective dissipation of heat generated in the brake shoe segments and providing for the effective prevention of transmission of excessive heat to the body portion.

A still further object of the invention is to provide a novel friction shoe for use as a part of a friction element for use in a disc brake or the like, said shoe being provided with a plurality of through ventilating openings which extend from the outer edge of the shoe to the inner edge thereof. According to this object the ventilating openings make it possible to produce a friction shoe which will be free of any thick portions of metal in which heat can be stored. This is important since heat which is generated at the friction faces of the shoe only has to penetrate a relatively thin section of metal to quickly reach the inner surfaces of the openings where it is carried off by the currents of cool air passing through the ventilating openings. It has been found in practice that excessively high temperatures are not attained in these friction shoes, this being due to the fact that there are no thick sections of metal which are not exposed to a cooling air current.

In the accompanying drawings Figure 1 is a face view of a friction element constructed in accordance with the invention, portions of the element being broken away to more clearly illustrate the several parts thereof; Figure 2 is a plan view of a portion of the friction element; Figure 3 is a fragmentary sectional view taken on the line 3—3 of Figure 1; Figure 4 is an isometric view of one of the torque transmitting members of the friction element; and Figure 5 is a fragmentary sectional view taken on the line 5—5 of Figure 1. Figure 6 is a face view similar to Figure 1 of a friction element embodying a modification of the means for attaching the friction element to the body portion thereof; Figure 7 is a plan view of a portion of the friction element shown in Figure 6; and Figure 8 is a fragmentary sectional view taken on the line 8—8 of Figure 6.

For illustrative purposes, the friction elements shown in the drawings are each of a type which is particularly suitable for use as a rotating element of a disc brake for a heavy vehicle such as a railway car or locomotive.

The friction element shown in Figures 1 to 5 inclusive comprises a body portion which may consist of two substantially identical axially aligned annular flat plates 1 which are spaced apart axially and are maintained in this relationship by means of a plurality of radially disposed torque transmitting members 2, each having a body portion 3 which extends between the plates and to which the plates are rigidly secured by welding, as shown, or by any other suitable means. Each member 2 is provided at one end with a lug 4 which projects from the body portion 3 to a point beyond the inner peripheral edges of the plates 1, which lug is adapted to interlock with a rotatable part (not shown) to be braked. These lugs constitute the torque connection between the friction element and the part to be braked. At the other end of the body portion 3 of each member 2 two lugs 5 are provided which are preferably integral with the body portion and are spaced apart in the direction circumferentially of the plates 1. These lugs extend outwardly from the body portion 3 to a point beyond the outer peripheries of the plates 1 and are wedge-shaped, each having an outer end face 6 arranged substantially parallel to a corresponding oppositely arranged face on the other lug and also substantially parallel to a line extending through the axes of plates 1, and each also having a sloping inner end face 7, the two faces 7 sloping toward each other in the direction of the axes of said plates. The faces 7 on each two adjacent lugs 5 of each adjacent pair of members 2 are parallel to each other. The faces of each body portion 3 to which the plates 1 are secured are each provided with a groove 8 for the reception of a portion of a T-shaped brake shoe securing means 9 which will be fully described later.

Disposed around the outer peripheries of the plates 1 and separate therefrom are a plurality of relatively short arcuate brake shoes 10 which are arranged in end to end relationship with each other and which have their ends spaced apart for the purpose of permitting the shoes to expand in the directions of their length. Each friction shoe is preferably made in the form of a segment of a circle and is preferably made from a piece of rolled steel. For the purpose of dissipating heat which will be created in the shoes in braking and for the purpose of maintaining the shoes as light as possible consistent with strength, a plurality of spaced ventilating holes or ducts 11 are provided in each shoe, which holes or ducts extend through the shoe from its inner edge surface to its outer edge surface.

Each end of each friction shoe is provided with a slot 12 which extends through the shoe from its outer edge surface to its inner edge surface to form an integral laterally extending driving bar 13, the inner end surface 14 of the bar engaging with the corresponding inner sloping surface 7 of one of the lugs 5 of an adjacent torque transmitting member. When the shoe is properly positioned as shown in Figures 1 and 2, the slot 12 accommodates one of lugs 5 of one of the torque transmitting members 2 and the surface 14 of the driving bar 13 rests on the sloping surface 7 of the lug 5. The adjacent end of the adjacent shoe will be supported on the other lug 5 of the member in the same manner.

It should here be mentioned that the surfaces 14 of each friction shoe are parallel with each other so as to render it possible to easily position a shoe on the lugs 5 of two torque transmitting members and to at the same time insure a snug fit between the shoe and the lugs.

With the adjacent ends of two adjacent friction shoes resting on the lugs 5 of one of the torque transmitting members there will be a space between these adjacent ends of the shoes, and since no parts of the shoes can engage the faces 6 of the lugs, the shoes are free to expand and subsequently contract in the direction of their length without restraint.

Extending across the space between the adjacent ends of two adjacent friction shoes and across the outer ends of the lugs 5 of the respective torque transmitting member and also across the outer ends of the driving bars 13 and fitting between the walls of the slots 12 is a securing bar 15 of the securing means 9 having inwardly extending end lugs 16 which engage the faces 6 of the lugs 5. This securing bar, intermediate its ends, is welded or otherwise secured to the web 17 of a U-shaped member having spaced flanges or side pieces 18 which extend into the grooves 8 which are provided on opposite sides of the body portion 3 of the torque transmitting member. These side pieces 18 extend inwardly to a point beyond the inner periphery of the plates 1 and are secured to the plates and to the body portion 3 against outward radial movement by means of a pin 19 which extends through accommodating registering openings provided in the plates 1, side pieces 18 and body portions 3 of the torque transmitting members 2.

The securing bars 15, while they do secure the friction shoes 10 to the torque transmitting members 2 against outward movement relative to the member, will not act to restrain the lengthwise expansion and subsequent contraction of the shoes. It will be noted that with the shoes properly mounted on the torque transmitting members there is nothing to restrain expansion and contraction of the shoes in the direction of their thickness or of their radial width.

To lock each pin 19 against accidental endwise movement a wire 20 is passed across the body portion 3 of the respective torque transmitting member 2 at a point between the lugs 5 and thence through bores in the side pieces 18, and then each end of the wire is threaded inwardly through a space 21 provided between the inner surface of one of the plates 1 and the adjacent surface of one of the side pieces 18 of the U-shaped member and through a suitable opening 22 provided in the pin.

It will be understood that the lugs 5 of the torque transmitting member 2 are each of such transverse thickness as to fit snugly between the inner surfaces 23 of the side walls of the slot 12 so that they will maintain the friction shoes against transverse movement relative to the lugs. Radial outward movement of the friction shoes will be prevented by the securing bars 15 which are held in place by the pins 19. Since the ends of the bars 15 are confined between the walls of the slots 12 of two adjacent friction shoes said bars cannot move laterally from their proper position.

When the friction element shown is employed as a rotatable friction brake element of a disc brake and the member to be braked (not shown) is being rotated in a counter-clockwise direction and consequently driving the brake element in the same direction through the medium of the lugs 4, the lugs 5 of the torque transmitting members, which engage the forward driving bars 13, serve to drive the friction shoes 10 in this direction. From this it will be understood that one lug 5 of each torque transmitting member 2 serves to drive the friction shoes 10 in a counterclockwise direction. When the member to be braked is rotating in the opposite or clockwise direction the other lug 5 of each torque transmitting member serves to drive the friction shoes. Since the outer ends of the lugs 5 of each torque transmitting member 2 are tied together by the securing bar 15, any tendency of the bending of the lug which is transmitting torque will be resisted by the other lug, thus one lug serves to strengthen the other.

In Figs. 6, 7 and 8 a modified form of friction element is illustrated which differs from the element shown in Figs. 1 to 5, inclusive, in one respect, namely, in the means for removably attaching the friction shoes 10 to the annular plates 1 of the body portion of the element.

In this form of the invention the body 3 of each torque transmitting member 2 is provided with a pair of ears 24 each of which projects outwardly from the surface 6 of the member. These ears are located above the driving lug 4 and are disposed between the plates 1.

For securing the adjacent ends of two adjacent friction shoes 10 to one of the torque transmitting members 2 a U-bolt 25 is provided. The spaced side pieces 26 of this U-bolt engage the surfaces 6 of the member 2 and their ends extend through accommodating openings provided in the ears 24 and are provided with nuts 27 which engage the underside of the ears.

The cross piece 28 which integrally connects the side pieces 26 passes across the outer end of the lugs 5 of the torque transmitting member 2 and across the outer surface of the driving bars 13 of the friction shoes so as to hold the friction shoes 10 against outward movement relative to the member.

In this form of the invention the adjacent ends of two adjacent friction shoes are spaced apart in the same manner as the shoes in Fig. 1 so that they are free to expand, the U-bolt connection being so arranged that it will not materially restrain either expansion or contraction of the friction shoes.

It should here be mentioned that each of the two friction elements illustrated and hereinbefore described is so constructed that air may freely circulate through and around all of the several parts of the element and thus effectively dissipate heat created by the frictional engagement of the friction shoes with friction shoes of a cooperating friction element. Another feature of this ventilated structure is that it will greatly retard the transmission of heat from the shoes to the annular members 1.

While the body portion of the element has been shown and described as comprising two separate annular members which are secured together by means of the radially disposed torque transmitting members which are welded or otherwise secured to the annular member 1, it will be understood that the annular members and the torque transmitting members may be cast in one piece.

Having now described my invention, what I claim as new and desire to secure by Letters Patent, is:

1. In a friction element for a disc brake or the like, an annular body portion, a plurality of friction shoes expansible lengthwise when heated and arranged in spaced end to end relationship with each other and encircling said body portion in radially spaced relationship therewith, torque transmitting means secured to said body portion and adapted to engage each shoe on two surfaces which face each other and which are disposed adjacent respectively, opposite ends of the shoe for turning the shoe with said body portion and for permitting lengthwise expansion of the shoe, when heated relative to said torque transmitting means, and means securing said shoes to said torque transmitting means against outward movement radially of said body portion.

2. In a friction element for a disc brake or the like, an annular body portion, comprising a plurality of spaced axially aligned annular members, a plurality of circumferentially spaced torque transmitting members interposed between and secured to said annular members, friction shoes encircling the outer peripheries of said annular members in spaced end to end relationship with each other and carried by said torque transmitting members in radial spaced relationship with said outer peripheries of the annular members, and means for securing said friction shoes to said torque transmitting members.

3. In a friction element for a disc brake or the like, a body portion, a plurality of radially disposed circumferentially spaced torque transmitting members secured to said body portion, a plurality of individual friction shoes encircling the outer edge of said body portion and spaced radially therefrom and carried by said torque transmitting members, and hand removable means for securing each of said friction shoes at one end to one of said torque transmitting members and at the other end to another of said torque transmitting members.

4. In a friction element for use in disc brakes or the like, a body portion having a plurality of outwardly extending spaced pairs of spaced lugs, the lugs of each pair being spaced apart circumferentially of the body portion, a plurality of friction shoes encircling said body portion and arranged in spaced end to end relationship with each other and interlocked with and carried by said lugs, means secured to said body portion interlocking the lugs of each pair of lugs together and securing the adjacent ends of two adjacent shoes to the lugs of each pair of lugs against outward movement and permitting lengthwise expansion and contraction of said shoes.

5. In a friction element for use in disc brakes or the like, a body portion comprising a pair of spaced axially aligned annular members, a plurality of spaced radially disposed elements secured to said members, a pair of circumferentially spaced lugs carried by each of said elements, a plurality of spaced friction shoes encircling said annular members and arranged in spaced end to end relationship with each other, one end of each shoe engaging one of the lugs of each of said elements and the adjacent end of an adjacent shoe engaging the other of the lugs of each element, and a U-shaped member secured to each of said elements for holding the adjacent ends of two adjacent shoes against outward radial movement relative to said body portion.

6. In a friction element for use in disc brakes or the like, a body portion comprising a pair of spaced axially aligned annular members, a plurality of spaced radially disposed elements secured to said members, a pair of circumferentially spaced lugs carried by each of said elements, a plurality of spaced friction shoes encircling said annular members and arranged in spaced end to end relationship with each other, one end of each shoe engaging one of the lugs of each of said elements and the adjacent end of an adjacent shoe engaging the other of the lugs of each element, and a U-shaped member secured to each of said elements for holding the adjacent end of two adjacent shoes against outward radial movement relative to said body portion.

7. A friction shoe for use as a part of a friction element of a disc brake, said shoe comprising an arcuate section of friction material having ventilating ducts extending therethrough from the inner curved edge of the shoe to the outer curved surface of the shoe, said ducts being so arranged as to eliminate thick sections of said material and a driving bar extending across the duct at each end of the shoe for engagement with a part of said friction element.

8. A brake rotor comprising a plurality of friction segments arranged in a generally annular series to form a brake ring, each segment having spaced friction faces and an intermediate fluid chamber, a support member, readily removable means connecting said support member to said segments for restraining radially outward movement of the segments due to centrifugal force during rotation of said rotor, and driving connections independent of said removable means for transmitting rotational movement of said support member to said segments.

JOSEPH C. McCUNE.

REFERENCES CITED

The following references are of record in the file of this patent:

UNITED STATES PATENTS

| Number | Name | Date |
|---|---|---|
| 2,108,059 | Glasner | Feb. 15, 1938 |
| 2,190,767 | Benson | Feb. 20, 1940 |
| 2,233,594 | Eksergian | Mar. 4, 1941 |
| 2,277,603 | Nutt et al. | Mar. 24, 1942 |

FOREIGN PATENTS

| Number | Country | Date |
|---|---|---|
| 403,513 | Great Britain | Dec. 28, 1933 |
| 547,934 | Great Britain | Sept. 17, 1942 |